US012594788B2

(12) United States Patent
Römer et al.

(10) Patent No.: US 12,594,788 B2
(45) Date of Patent: Apr. 7, 2026

(54) MULTI-LAYER TREAD FOR USE IN VEHICLE TYRES

(71) Applicant: Continental Reifen Deutschland GmbH, Hannover (DE)

(72) Inventors: Justus Römer, Hemmingen (DE); Ömür Misir, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/688,366

(22) PCT Filed: Jul. 26, 2022

(86) PCT No.: PCT/DE2022/200166
§ 371 (c)(1),
(2) Date: Mar. 1, 2024

(87) PCT Pub. No.: WO2023/030586
PCT Pub. Date: Mar. 9, 2023

(65) Prior Publication Data
US 2024/0383281 A1 Nov. 21, 2024

(30) Foreign Application Priority Data
Sep. 1, 2021 (DE) ..................... 10 2021 209 583.6

(51) Int. Cl.
*B60C 11/00* (2006.01)
(52) U.S. Cl.
CPC ...... *B60C 11/0058* (2013.01); *B60C 11/0008* (2013.01); *B60C 2011/0025* (2013.01); *B60C 2011/0033* (2013.01)

(58) Field of Classification Search
CPC .................... B60C 11/0058; B60C 2011/0025
See application file for complete search history.

(56) References Cited

U.S. PATENT DOCUMENTS 4,319,620 A * 3/1982 Knill ...................... B60C 11/18
152/209.5
6,516,847 B1 * 2/2003 Amaddeo ............ B60C 1/0016
156/96

(Continued)

FOREIGN PATENT DOCUMENTS

DE 2362627 A * 6/1975 ............. B60C 11/00

OTHER PUBLICATIONS

Translation for German 2362627 (Year: 2025).*

(Continued)

*Primary Examiner* — Steven D Maki
(74) *Attorney, Agent, or Firm* — Richard A. Wolf; Gregory Adams

(57) ABSTRACT

The invention relates to a multi-layer tread for use in vehicle tires, comprising: a) a base layer comprising a first rubber material, and b) a top layer arranged on the base layer and connected to the base layer, wherein the top layer comprises: i) a first side region comprising a second rubber material, ii) a second side region comprising a third rubber material, and iii) a central region arranged between the first side region and the second side region and comprising a fourth rubber material, wherein the first rubber material has a higher modulus of elasticity than the fourth rubber material, and wherein the fourth rubber material has a higher modulus of elasticity than the second rubber material and the third rubber material.

8 Claims, 1 Drawing Sheet

(56) References Cited

U.S. PATENT DOCUMENTS

| | | |
|---|---|---|
| 8,944,124 B2 | 2/2015 | Nakagawa |
| 2005/0167019 A1* | 8/2005 | Puhala ................ B60C 11/0058 |
| | | 152/209.4 |
| 2015/0239296 A1* | 8/2015 | Fukuda .............. B60C 11/0041 |
| | | 152/209.5 |
| 2018/0154696 A1* | 6/2018 | Isitman ................... C08L 15/00 |
| 2021/0046783 A1 | 2/2021 | Schweitzer et al. |
| 2021/0046785 A1 | 2/2021 | Schweitzer et al. |
| 2021/0213784 A1 | 7/2021 | Miyamoto |

OTHER PUBLICATIONS

International Search Report dated Sep. 23, 2022 of International Application PCT/DE2022/200166 on which this application is based.

* cited by examiner

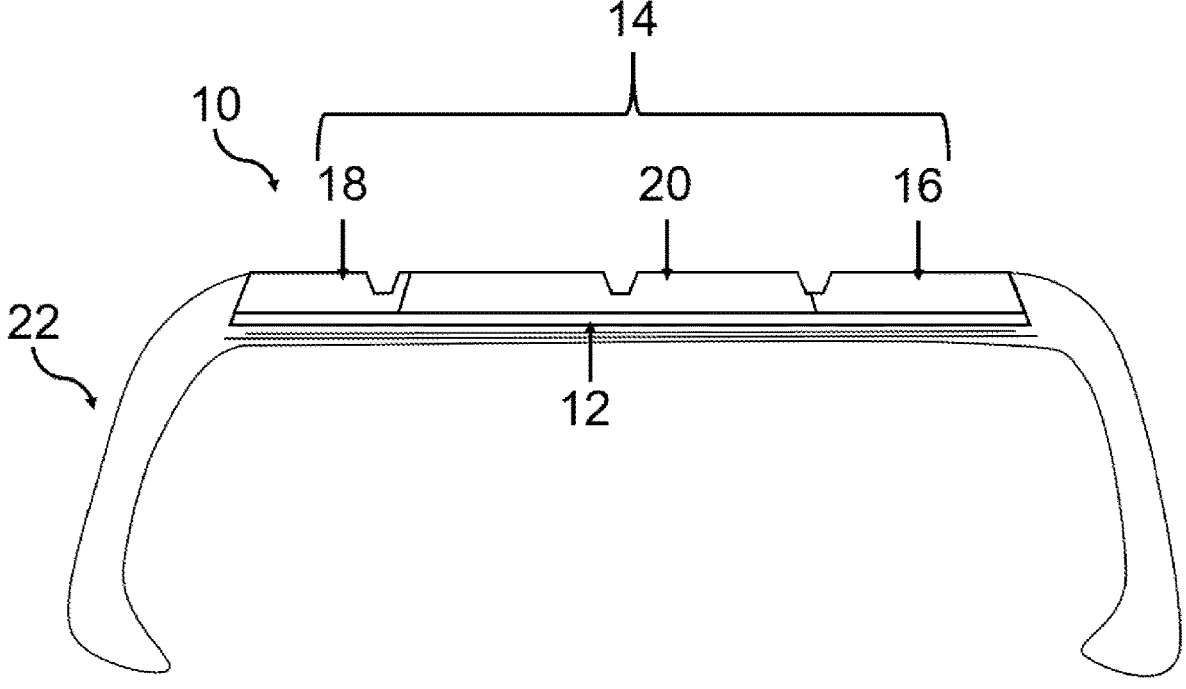

MULTI-LAYER TREAD FOR USE IN VEHICLE TYRES

CROSS-REFERENCE TO RELATED APPLICATIONS

The present application is a National Stage Application under 35 U.S.C. § 371 of International Patent Application No. PCT/DE2022/200166 filed on Jul. 26, 2022, and claims priority from German Patent Application No. 10 2021 209 583.6 filed on Sep. 1, 2021, in the German Patent and Trademark Office, the disclosures of which are herein incorporated by reference in their entireties.

BRIEF SUMMARY

The invention relates to a multi-layer tread for use in vehicle tires, to the use of corresponding multi-layer treads as treads for vehicle tires, and to a corresponding vehicle tire, comprising the corresponding multi-layer tread. Also disclosed is a method for producing corresponding multi-layer treads and a method based thereon for the production of vehicle tires.

The subject matter of the invention is defined in the appended claims.

Constantly increasing demands are made on the properties and performance characteristics of modern pneumatic vehicle tires, especially when used in high-performance sectors. One important high-performance application in this context is the use as a sports tire, for which a vehicle tire must have particularly good rolling properties. On modern pneumatic vehicle tires, the tread makes a significant contribution to establishing the handling properties. The tread is the part of the vehicle tire which is in contact with the road and the properties of which are decisive co-determinants of the behavior of the pneumatic vehicle tire.

Particularly in the sports tire sector, new concepts for higher performance treads have been developed in the past that make use of a tread design which is made up of several parts, in particular different rubber materials (also referred to as "MCT" concepts). One particular approach for sports tires in this context is to provide a harder shoulder for the tread in the shoulder region of the vehicle tire. This is accomplished by using a rubber material with a high modulus of elasticity in the tread region provided for the shoulder. This makes it possible to improve the transverse stiffness of the profile and hence the rolling properties. However, the use of such a rubber mixture in the shoulder regions is generally associated with an increase in rolling resistance. This is generally regarded as disadvantageous, inter alia and precisely because of the effect on energy consumption.

For energy-saving tires that are optimized for rolling resistance, it would be more desirable to provide the treads with rubber materials that are softer, i.e. have a lower rolling resistance, in the shoulder region of the vehicle tires, said materials having a lower modulus of elasticity. When using multi-component treads, there is to this extent also a conflict between the aims of optimized transverse stiffness of the profile, which is decisive for the handling properties, and the rolling resistance to be achieved with this tread.

The primary object of the present invention was to eliminate or at least to reduce the disadvantages known from the prior art.

Thus, the object of the present invention was, in particular, to resolve in the best way possible the above-described conflict between the aims of optimum transverse stiffness and a minimum rolling resistance.

It was thus the object of the present invention to specify a tread which has excellent transverse stiffness and, at the same time, has a rolling resistance which is as low as possible.

At the same time, it was desirable that the tread to be specified should be as simple as possible to produce and, ideally, should be capable of being produced using materials that are conventional in tire manufacture.

In particular, however, the tread to be specified should have excellent cornering properties.

The inventors of the present invention have now realized that the above-described objects can surprisingly be achieved if a multi-layer tread as defined in the claims is provided. In particular, the inventors have realized that the above-described objects can be achieved if a top layer provided for contact with the road is produced from at least three partial regions, wherein rubber materials with a low rolling resistance and a low modulus of elasticity are used in the side regions, which are arranged in the shoulder regions in the subsequent tire, enclosing between them a central region of the top layer of the tread, which is formed from a rubber mixture with a higher modulus of elasticity, insofar as this top layer is then stabilized on the underside by a relatively hard and stiff base layer with a high modulus of elasticity.

The above-stated objects are accordingly achieved by means of the subject matter of the invention as defined in the claims. Preferred configurations according to the invention will emerge from the subclaims and from the statements below.

Embodiments that are referred to below as being preferred are, in particularly preferred embodiments, combined with features of other embodiments that are referred to as being preferred. Combinations of two or more of the embodiments that are described below as being particularly preferred are therefore very particularly preferred. Embodiments are likewise preferred in which a feature, referred to as being preferred to a certain degree, of one embodiment is combined with one or more further features, referred to as being preferred to a certain degree, of other embodiments. Features of preferred uses, vehicle tires and methods are apparent from the features of preferred multi-layer vehicle tires.

The invention relates to a multi-layer tread for use in vehicle tires, comprising:

a) a base layer comprising a first rubber material, and b) a top layer arranged on the base layer and connected to the base layer, wherein the top layer comprises:

i) a first side region comprising a second rubber material, ii) a second side region comprising a third rubber material, and iii) a central region arranged between the first side region and the second side region and comprising a fourth rubber material, wherein the first rubber material has a higher modulus of elasticity than the fourth rubber material, and wherein the fourth rubber material has a higher modulus of elasticity than the second rubber material and the third rubber material.

The multi-layer tread according to the invention is suitable for use in vehicle tires and is provided for this purpose. In agreement with specialist understanding in the art, a corresponding multi-layer tread can be produced separately (e.g. for use in the full retreading of tires) or can be formed together with other components of a vehicle tire in the course of tire production.

The multi-layer tread according to the invention comprises a first layer, which is referred to as the base layer. This base layer comprises a first rubber material. Arranged on this base layer is a top layer, which is connected to the base layer, giving a multi-layer composite structure. The top layer comprises a plurality of different regions, namely two side regions and a central region arranged between these side regions. While the central region comprises a fourth rubber material, the first and the second side region comprise a second and a third rubber material, respectively.

In the multi-layer tread according to the invention, the rubber materials used have moduli of elasticity which bear a specific relationship to one another. Thus, the first rubber material has the highest modulus of elasticity, whereas the second and the third rubber material, i.e. the rubber materials used in the side regions, have a lower modulus of elasticity than the fourth rubber material used in the central region. This gives a specific multi-layer construction with a multi-component top layer which surprisingly leads to excellent handling properties with, at the same time, an advantageous rolling resistance.

Without wishing to be tied to this theory, the inventors of the present invention assume that it is the combination of the high-modulus base layer with the top layer composed of a plurality of partial regions with a different modulus of elasticity which leads to this advantageous effect. Here, the inventors assume that the specific construction of the top layer, which has a complex, discontinuous characteristic of the modulus of elasticity transversely to the running direction, and the stabilization of the soft side regions by the stiff base layer lead to the excellent properties of the multi-layer tread according to the invention.

The expression rubber material used in the context of the present invention is clear to an expert in the field of vehicle tire manufacture and refers to elastically deformable plastics, i.e. plastics which can be deformed elastically under tension and/or compression. For a person skilled in the art, it is clear that rubber materials that are vulcanized products of rubber mixtures of the kind that are frequently used in the tire industry are in particular preferred in this context. There is therefore also a preference for a multi-layer tread according to the invention, wherein the first rubber material and/or the second rubber material and/or the third rubber material, and/or the fourth rubber material, preferably all the rubber materials, can be produced by vulcanizing vulcanizable rubber mixtures, wherein the vulcanizable rubber mixtures preferably comprise at least one diene rubber and at least one filler.

In the context of the present invention, the expression modulus of elasticity denotes the average dynamic storage modulus E', which, for rubber materials, is determined from a dynamic-mechanical measurement at 55° C. in accordance with DIN 53513:1990-03, wherein the average dynamic storage modulus E' is the average of two measurements at 0.15% elongation and 8% elongation.

Even if, in principle, any desired constructions of the multi-layer tread are conceivable, it is expedient to adopt a strip-shaped design for the multi-layer tread, thus enabling it to be laid around the carcass of a pneumatic vehicle tire, for example. In general, a separately produced strip-shaped tread will correspond approximately in its dimensions to the surface area of the carcass to which it is to be applied. Alternatively, the multi-layer tread according to the invention may also be annular, particularly if it is formed as part of a vehicle tire during the production of the vehicle tire. Accordingly, there is a preference for a multi-layer tread according to the invention, wherein the multi-layer tread is annular or strip-shaped, wherein the length of the strip-shaped tread is greater than the width of the tread.

Similarly, the individual components, i.e. the base layer and the top layer, are also strip-shaped or a strand formed into a ring.

Consequently, there is a preference for a multi-layer tread according to the invention, wherein the base layer is annular or strip-shaped, wherein the top layer arranged on the base layer is annular or strip-shaped, wherein preferably all the regions of the top layer are annular or strip-shaped.

In principle it is possible to provide, in addition to the above-defined layers and regions, further layers as part of the multi-layer tread, or to form further regions of the top layer by means of other rubber materials, for example. It is thereby advantageously possible to adapt the properties of the multi-layer tread according to the invention to the respective requirements. However, it is explicitly preferred for the multi-layer tread to be composed of the two layers indicated and, in turn, for the top layer to consist of three regions, as indicated above. Thus, there is a preference for a multi-layer tread according to the invention, wherein the multi-layer tread consists of the base layer and the top layer, and/or wherein the top layer consists of the first side region, the second side region and the central region.

In the estimation of the inventors of the present invention, the advantageous properties of the multi-layer tread can be reliably achieved if the ratios of the moduli of elasticity are set in the manner defined above. In the context of their own development work, however, the inventors were able to identify particularly suitable relations between the values of the moduli of elasticity of the various rubber materials by means of which particularly advantageous properties can be obtained. One advantage of the multi-layer treads according to the invention has proven here to be the fact that it is also possible here to use the same rubber material for the first and the second side region, which can be regarded as particularly advantageous in view of the starting materials required for production and the outlay on production.

Specifically, there is a preference for a multi-layer tread according to the invention, wherein the quotient of the modulus of elasticity of the first rubber material divided by the modulus of elasticity of the fourth rubber material is in the range of from 1.01 to 1.2, preferably in the range of from 1.02 to 1.15, particularly preferably in the range of from 1.03 to 1.1. Moreover, there is a preference for a multi-layer tread according to the invention, wherein the quotient of the modulus of elasticity of the fourth rubber material divided by the modulus of elasticity of the second rubber material is in the range of from 1.1 to 2.3, preferably in the range of from 1.3 to 2.0, and/or wherein the quotient of the modulus of elasticity of the fourth rubber material divided by the modulus of elasticity of the third rubber material is in the range of from 1.1 to 2.3, preferably in the range of from 1.3 to 2.0. There is likewise a preference for a multi-layer tread according to the invention, wherein the quotient of the modulus of elasticity of the second rubber material divided by the modulus of elasticity of the third rubber material is in the range of from 0.8 to 1.2, preferably in the range of from 0.9 to 1.1, particularly preferably in the range of from 0.95 to 1.15. In particular, there is a preference for a multi-layer tread according to the invention, wherein the second rubber material and the third rubber material are the same rubber material.

With the relations defined above, it is advantageously possible to design multi-layer treads according to the invention, the average modulus of elasticity of which, i.e. the average modulus of elasticity, weighted according to mass, of all the components of the multi-layer tread, can be adapted to the fundamental requirements of the specific applications. It is thereby possible, for example, to supply inherently harder or softer tires without having to depart from the advantageous teaching according to the invention. However, the inventors of the present invention were also able to identify absolute value ranges for the respective moduli of elasticity with which, in the estimation of the inventors, it is possible to obtain multi-layer treads which lead to particularly good handling properties with, at the same time, good rolling resistance when used in pneumatic vehicle tires, especially sports tires. Specifically, there is a preference for a multi-layer tread according to the invention, wherein the modulus of elasticity of the first rubber material is in the range of from 12 to 17 MPa, preferably in the range of from 13 to 16 MPa, and/or wherein the modulus of elasticity of the second rubber material is in the range of from 6 to 11 MPa, preferably in the range of from 7 to 10 MPa, and/or wherein the modulus of elasticity of the third rubber material is in the range of from 6 to 11 MPa, preferably in the range of from 7 to 10 MPa, and/or wherein the modulus of elasticity of the fourth rubber material is in the range of from 11 to 16 MPa, preferably in the range of from 12 to 15 MPa.

Here, it is apparent to a person skilled in the art that one or more of the values indicated above should advantageously be combined with the above-defined ratios. It can be regarded as very particularly advantageous if the modulus of elasticity of all the rubber materials is in the above-indicated ranges which are indicated above for the respective rubber materials.

It may be regarded as a major advantage of the multi-layer tread according to the invention that the rubber materials in the layers and regions can also be combined in principle with further materials in order to adapt the properties more specifically to the respective requirements. For an expert in the field of tire manufacture, however, it is immediately apparent that it is explicitly preferred if the respective layers and regions, preferably all the layers and regions, are composed substantially of the respective rubber materials, such that the properties of the corresponding parts of the multi-layer tread are dominated by the properties of the rubber materials. Accordingly, there is a preference for a multi-layer tread according to the invention, wherein the proportion by mass of the first rubber material in the base layer is 90% or more, preferably 95% or more, particularly preferably 99% or more, very particularly preferably 99.5% or more, based on the mass of the base layer, and/or wherein the proportion by mass of the second rubber material in the first side region is 90% or more, preferably 95% or more, particularly preferably 99% or more, very particularly preferably 99.5% or more, based on the mass of the first side region, and/or wherein the proportion by mass of the third rubber material in the second side region is 90% or more, preferably 95% or more, particularly preferably 99% or more, very particularly preferably 99.5% or more, based on the mass of the second side region, and/or wherein the proportion by mass of the fourth rubber material in the central region is 90% or more, preferably 95% or more, particularly preferably 99% or more, very particularly preferably 99.5% or more, based on the mass of the central region. To this extent, it is explicitly preferred if the base layer is free from strength members.

In addition to the modulus of elasticity, the inventors of the present invention have realized that it leads to particularly advantageous embodiments if the hardness of the various rubber materials is also set in a specific manner. It has proven particularly advantageous here if the rubber material used in the base layer and in the central layer is significantly harder than the rubber materials used in the side region, wherein the inventors have been able to identify suitable absolute hardnesses for this purpose too. Specifically, there is a preference for a multi-layer tread according to the invention, wherein the first rubber material and/or the fourth rubber material have/has a higher Shore A hardness than the second rubber material and the third rubber material, wherein the Shore A hardness of the first rubber material and/or of the fourth rubber material is preferably in the range of from 70 to 80, wherein the Shore A hardness of the second rubber material and/or of the third rubber material is preferably in the range of from 60 to 69. In this case, the Shore A hardness is determined at room temperature in accordance with DIN ISO 7697-1-2018-07.

In the estimation of the inventors, it is possible in principle for the top layer to be connected to the base layer exclusively via the central region, for example, with the result that the two side regions on the left and right of the central region rest on the central region and do not themselves have any direct contact with the base layer because, for example, a thin part of the central region is interposed. In the estimation of the inventors, however, there is an explicit preference for embodiments in which all the regions of the top layer are directly in contact with the base layer and are accordingly connected to it. There is therefore a preference for a multi-layer tread according to the invention, wherein the first side region, the second side region and the central region are connected to the base layer.

Even if it is possible in principle to produce the connection between the base layer and the top layer in different ways, it is explicitly preferred if it is a material connection between the layers, in particular because such a connection can be produced in a particularly efficient way by a vulcanization process. There is thus a preference for a multi-layer tread according to the invention, wherein the base layer is connected to the top layer, preferably to all the regions of the top layer, in the contact region by a material connection, wherein the material connection has preferably been produced or promoted by a vulcanization process.

It has proven particularly advantageous if the transition between the base layer and the top layer is as seamless as possible, i.e. that none of the layers protrudes beyond the other layer. This avoids the situation where points of attack for mechanical separation of the composite structure arise, and it is therefore possible to obtain particularly durable multi-layer treads. There is therefore a preference for a multi-layer tread according to the invention, wherein the base layer and the top layer, preferably all the regions of the top layer taken together, have substantially the same dimensions of the surface area on the side facing the respective other layer.

It may be regarded as an advantage of the multi-layer tread according to the invention that it is relatively flexible as regards the embodiment of the contact region between the layers, and that the advantageous properties in the resolution of the conflict of aims do not necessarily require that a level contact region is formed between the two layers, even if this may be preferred for certain applications. Thus, there is a preference for a multi-layer tread according to the invention, wherein the top layer, preferably all the regions of the top layer, have an undulating or a substantially level contact surface, preferably an undulating contact surface, with the base layer.

In the estimation of the inventors, it is particularly preferred if the underlying base layer is not merely of substantially planar design but if this has a type of "nose", which rises as a material projection on the side facing the top layer, wherein it is of course preferred, in the case of the generally strip-shaped or annular treads, if a corresponding elevation extends substantially over the entire length of the tread, with the result that, in the case of an annular tread of the kind which occurs, for example, in formation on a vehicle tire, an encircling material projection is formed. In the case where non-conducting top layers are used, a corresponding material projection can advantageously serve for electrostatic discharge. There is a preference for a multi-layer tread according to the invention, wherein the base layer has one or more material projections on the side facing the top layer, preferably over the entire length of the tread. In a particularly preferred embodiment, the material projection formed lies substantially in the center of the surface of the base layer.

In light of the above statements, it is very particularly preferred if a material projection as described above extends through the entire top layer in such a way that the central region of this top layer is completely or partially divided into two parts by the material projection, wherein the central region is then divided into a first central part and a second central part, which can each be connected to the material projection. Particularly if the material projection is formed from the same material as the base layer or is formed from another rubber material with a comparable hardness and a comparable modulus of elasticity, a particularly advantageous composite material is obtained in the central region of the multi-layer tread, said material having a particularly high profile stability and possessing particularly advantageous handling properties. Thus, there is a preference for a multi-layer tread according to the invention, wherein the base layer has, on the side facing the top layer, a material projection which extends over the entire length of the tread, wherein the central region is of two-part design and comprises a first central part and a second central part, wherein the first central part and the second central part are arranged on different sides of the material projection, wherein the material projection is preferably connected materially at the flanks to the first central part and the second central part, wherein the thickness of the top layer is preferably not greater than the height of the material projection.

In principle, it is conceivable to fix all the partial regions of the top layer on the multi-layer tread solely by a connection to the base layer. In the estimation of the inventors, however, it is advantageous for the majority of applications to also connect the partial regions of the top layer to one another, wherein a material connection, in particular a connection of the kind that can be produced by vulcanization, is preferred. There is thus a preference for a multi-layer tread according to the invention, wherein the central region is connected to the first side region and the second side region by a material connection, wherein the material connection has preferably been produced or promoted by a vulcanization process.

In the estimation of the inventors, it is particularly advantageous if the partial regions of the top layer are not formed in an overlapping manner, wherein it has proven particularly advantageous with a view to durability if contact surfaces that are oblique relative to the underlying base layer are established. There is a preference for a multi-layer tread according to the invention wherein the central region and the first side region abut one another in the contact region, wherein the contact surface is particularly preferably not orthogonal to the surface of the base layer in the contact region, and/or wherein the central region and the second side region abut one another in the contact region, wherein the contact surface is particularly preferably not orthogonal to the surface of the base layer in the contact region.

Even if, in the estimation of the inventors, the multi-layer treads according to the invention may in principle also have good properties on unprofiled tires, the advantages of the multi-layer treads according to the invention are evident particularly when a profiled surface is provided, ensuring that the advantages with increased profile stability come into effect. There is a preference for a multi-layer tread according to the invention, wherein the multi-layer tread has a profiled surface on the side of the top layer, wherein the profiled surface preferably has asymmetrical profiling, and/or wherein the profiled surface preferably has at least three profile grooves, particularly preferably precisely three.

It can be regarded as a particular advantage of the multi-layer treads according to the invention that they are very flexible as regards the positioning of the contact regions relative to the profile. By virtue of the stabilizing effect of the underlying base layer, it is thereby possible, in particular, to provide contact regions between a side region and the central region even in the region of a profile groove, in particular at the bottom of a profile groove, without negatively affecting the overall durability of the composite structure. In the estimation of the inventors of the present invention, it is even particularly preferred if at least one of the contact regions between a side region and the central region is situated at the bottom of a profile groove, whereas the other contact region should be situated in the region of a profile elevation, i.e. in a region of the surface in which no profile groove is provided. Accordingly, there is a preference for a multi-layer tread according to the invention, wherein the contact region between the central region and the first side region is situated in the region of a profile groove and/or a profile elevation, preferably in the region of a profile groove, preferably at the bottom of a profile groove, and/or wherein the contact region between the central region and the second side region is situated in the region of a profile groove and/or a profile elevation, preferably in the region of a profile elevation.

In the estimation of the inventors, it would be possible in principle to obtain advantageous handling properties even with base layers which have a relatively great thickness, especially since a particularly thick base layer consisting of a stiff rubber material promises particularly high stability. However, it should be taken into account that a particularly thick additional layer is associated with an increase in the overall weight, and this is generally felt to be disadvantageous. Thus, in the estimation of the inventors, it is a particular advantage that even relatively thin base layers are sufficient to provide a positive effect on the overall handling properties and to resolve the conflict of aims, and it is surprisingly possible to stabilize even relatively thick top layers by means of relatively thin base layers. There is a multi-layer tread, wherein the average thickness of the top layer is greater by 100% or more, preferably by 200% or more, particularly preferably by 300% or more, very particularly preferably by 400% or more, than the average thickness of the base layer.

In principle, it is possible to adapt the proportions of the partial regions in the top layer in a flexible manner to the respective requirements of the application as long as at least three partial regions are provided. In order to obtain an effect which is as pronounced as possible, it is however expedient in the estimation of the inventors not to make any of the partial regions too small, particularly advantageous configurations being obtained when the central region is chosen to be larger than the side regions. Accordingly, there is a preference for a multi-layer tread according to the invention, wherein the volume ratio of the central region to the first side region is in the range of from 1 to 10, preferably in the range of from 1.3 to 8, particularly preferably in the range of from 1.6 to 6, very particularly preferably in the range of from 1.9 to 4, and/or wherein the volume ratio of the central region to the second side region is in the range of from 1 to 10, preferably in the range of from 1.15 to 8, particularly preferably in the range of from 1.3 to 6, very particularly preferably in the range of from 1.45 to 4, and/or wherein the volume of one side region is smaller than the volume of the other side region. Since multi-layer treads according to the invention are three-dimensional objects, which can, in particular, be formed in a strip-shaped or annular manner, the above information on the volume ratios corresponds to the expectations of a person skilled in the art. Since corresponding multi-layer treads generally have a high degree of symmetry and are generally of substantially uniform design along the entire length or the entire tire circumference, the above volume ratios can also be regarded as indicators of the surface area ratios of the surface areas of the various layers and regions in the cross section through the multi-layer tread.

In light of the above statements, it is clear for a person skilled in the art that the main application for multi-layer treads according to the invention is the use as a component part of a vehicle tire. The use of corresponding multi-layer treads as treads for vehicle tires results in vehicle tires which have excellent handling properties, wherein, in particular, the rolling behavior during cornering is improved in comparison with other tread structures. However, corresponding multi-layer treads advantageously also have a relatively lower rolling resistance, this being particularly advantageous with a view to fuel consumption, for example. Given this background, it is clear that the present invention also relates to the use of a multi-layer tread according to the invention in a vehicle tire and to a corresponding vehicle tire.

The invention thus furthermore relates to the use of a multi-layer tread according to the invention as a tread of a vehicle tire, in particular of a pneumatic vehicle tire, to improve the rolling behavior during cornering.

The invention thus also relates to a vehicle tire, in particular a pneumatic vehicle tire, comprising a multi-layer tread according to the invention as a tread.

In the case of the vehicle tire according to the invention, which comprises a multi-layer tread according to the invention as a tread, it is particularly advantageous if said tread is embodied in such a way that, in the edge region of the multi-layer tread according to the invention, the sidewalls of the vehicle tire, which can be raised during manufacture on a tire building drum, for example, overlap said edge region since the multi-layer tread according to the invention is thereby integrated particularly well into the overall composite structure of the vehicle tire (so-called "sidewall over tread"). Accordingly, there is a preference for a vehicle tire according to the invention, wherein the multi-layer tread is overlapped on both sides by the sidewall of the vehicle tire in the edge region.

It may be regarded as a major advantage of the multi-layer tread according to the invention that it can be produced in a particularly efficient way and without the necessity of sophisticated manufacturing techniques. In particular, a multi-layer tread according to the invention can be produced by coextrusion or by strip winding and subsequent vulcanization. Thus, the disclosure also includes a method for producing a multi-layer tread according to the invention, comprising one of the steps:

v1a) forming the base layer and the top layer by coextrusion of a first vulcanizable rubber mixture, a second vulcanizable rubber mixture, a third vulcanizable rubber mixture, a fourth vulcanizable rubber mixture and, optionally, further vulcanizable rubber mixtures to obtain an unvulcanized tread blank, or v1b) forming the base layer and the top layer by strip winding of a first strip-shaped material, comprising a first vulcanizable rubber mixture, a second strip-shaped material, comprising a second vulcanizable rubber mixture, a third strip-shaped material, comprising a third vulcanizable rubber mixture, a fourth strip-shaped material, comprising a fourth vulcanizable rubber mixture and, optionally, further strip-shaped materials, each comprising further vulcanizable rubber mixtures to obtain an unvulcanized tread blank, and the step of:

v3) vulcanizing the unvulcanized tread blank.

Based on the method disclosed above, it is also possible to produce vehicle tires if the unvulcanized tread blank is processed before vulcanization as part of a vehicle tire blank. Finally, the disclosure thus includes a method for producing a vehicle tire, in particular a pneumatic vehicle tire, comprising the steps of the disclosed method for producing a multi-layer tread, and, before step v3), the step of:

v2) producing a vehicle tire blank comprising the unvulcanized tread blank.

BRIEF DESCRIPTION OF THE DRAWINGS

Preferred embodiments of the invention are explained and described in more detail below with reference to the accompanying drawing. In the drawing:

FIG. 1 shows a schematic cross-sectional representation of a vehicle tire according to the invention having a multi-layer tread according to the invention.

DETAILED DESCRIPTION

FIG. 1 shows a schematic cross-sectional representation of a vehicle tire 22 according to the invention, which is embodied as a pneumatic vehicle tire. As a tread, the vehicle tire 22 comprises a multi-layer tread 10 according to the invention in a preferred embodiment. In the illustration in FIG. 1, the multi-layer tread 10 according to the invention is stabilized by the partially overlapping sidewalls of the vehicle tire 22, wherein the lines inserted below the tread indicate schematically that the tread is arranged on wound bandages and belt plies or on a carcass, as is conventional in modern radial tires.

The multi-layer tread 10 in FIG. 1 consists of a base layer 12, which in turn consists of a first rubber material, which has been obtained by vulcanization of a crosslinkable rubber mixture. Arranged on the base layer is a top layer 14. The top layer 14 consists of a first side region 16, a second side region 18, and a central region 20, which are each arranged on the base layer 12 and are materially connected thereto. The first side region 16 consists of a second rubber material, the second side region 18 consists of a third rubber material, and the central region 20 consists of a fourth rubber material.

In the preferred exemplary embodiment shown in FIG. 1, the first rubber material, i.e. the rubber material of the base layer, has a modulus of elasticity of 13 MPa and a Shore A hardness of 70. The fourth rubber material, i.e. the rubber material of the central region 20, has a modulus of elasticity of 12 MPa and a Shore A hardness of 74. In the preferred embodiment shown, the first side region 16 and the second side region 18 consist of the same rubber material, such that both side regions have a modulus of elasticity of 8 MPa and a Shore A hardness of 65. Here, the modulus of elasticity and the Shore A hardness are each determined as explained above.

On the side of the top layer 14, the multi-layer tread 10 comprises a profiled surface with three profile grooves. In this case, the contact region between the central region 20 and the first side region 16 is situated at the bottom of a profile groove, whereas the contact region between the central region 20 and the side region 18 is situated in the region of a profile elevation. Both contact regions between the side regions and the central region 20 form a contact surface which is oblique with respect to the surface of the underlying base layer 12. In the example shown in FIG. 1, the average thickness of the top layer 14 is more than 200% greater than that of the base layer 12.

The volume of the central region 20 is approximately twice as great as the volume of the side regions, and this can be estimated from the cross-sectional areas in the schematic cross section shown. In this case, the volume of the second side region 18 is somewhat smaller than the volume of the side region 16.

The multi-layer tread 10 according to the invention shown in FIG. 1 can be obtained by coextrusion of the corresponding vulcanizable rubber mixture and subsequent vulcanization, wherein the individual layers and partial regions can alternatively be formed by strip winding of the individual components. The vehicle tire 22 according to the invention can be obtained by vulcanization from a vehicle tire blank, which comprises the unvulcanized tread blank.

For a vehicle tire 22 with a tread 10 according to the invention, the "cornering coefficient" (CC) was determined at a load of 5000 N, which can be regarded as a measure of the handling properties. In this case, this determination is performed with the aid of a conventional test system for determining forces and torques on tires. For a tread 10 according to the invention, the CC value obtained was 11% above the value of a vehicle tire acting as a comparison with a single-component tread, the rubber material of which has a modulus of elasticity of 9 MPa and a Shore A hardness of 67, thereby making clear the high performance of the treads 10 according to the invention. Moreover, the tire achieved a rolling resistance which is 8% lower (test method according to ISO 28580).

LIST OF REFERENCE SIGNS

10 multi-layer tread
12 base layer
14 top layer
16 first side region
18 second side region
20 central region
22 vehicle tire

The invention claimed is:

1. A multi-layer tread for use in vehicle tires, comprising:
a base layer comprising a first rubber material; and
a top layer arranged on the base layer and connected to the base layer;
wherein the top layer comprises:
a first side region comprising a second rubber material;

a second side region comprising a third rubber material; and
a central region arranged between the first side region and the second side region and comprising a fourth rubber material;
wherein the first rubber material has a higher modulus of elasticity than the fourth rubber material, and wherein the fourth rubber material has a higher modulus of elasticity than the second rubber material and the third rubber material;
wherein the modulus of elasticity of the first rubber material is in the range of from 12 to 17 MPa, the modulus of elasticity of the second rubber material is in the range of from 6 to 11 MPa, the modulus of elasticity of the third rubber material is in the range of from 6 to 11 MPa, and the modulus of elasticity of the fourth rubber material is in the range of from 11 to 16 MPa; and
wherein the first rubber material and the fourth rubber material have a higher Shore A hardness than the second rubber material and the third rubber material, wherein the Shore A hardness of the first rubber material and of the fourth rubber material is in the range of from 70 to 80, wherein the Shore A hardness of the second rubber material and of the third rubber material is in the range of from 60 to 69.

2. The tread of claim 1, wherein the quotient of the modulus of elasticity of the first rubber material divided by the modulus of elasticity of the fourth rubber material is in the range of from 1.01 to 1.2,
wherein the quotient of the modulus of elasticity of the fourth rubber material divided by the modulus of elasticity of the second rubber material is in the range of from 1.1 to 2.3,
and
wherein the quotient of the modulus of elasticity of the fourth rubber material divided by the modulus of elasticity of the third rubber material is in the range of from 1.1 to 2.3.

3. The tread of claim 1, wherein the base layer has, on the side facing the top layer, a material projection which extends over the entire length of the tread, wherein the central region is of two-part design and comprises a first central part and a second central part, wherein the first central part and the second central part are arranged on different sides of the material projection, wherein the material projection is connected materially at the flanks to the first central part and the second central part, wherein the thickness of the top layer is not greater than the height of the material projection.

4. The tread of claim 1, wherein the multi-layer tread has a profiled surface on the side of the top layer, wherein the profiled surface has asymmetrical profiling, and/or wherein the profiled surface has at least three profile grooves.

5. The tread of claim 1, wherein the contact region between the central region and the first side region is situated in the region of a profile elevation and/or a profile groove at a bottom of a profile groove,
and
wherein the contact region between the central region and the second side region is situated in the region of a profile elevation.

6. The tread of claim 1, wherein the average thickness of the top layer is greater by 400% or more, than the average thickness of the base layer.

7. The tread of claim 1, wherein the tread is part of a tire.

8. A multi-layer tread for use in vehicle tires, comprising:
a base layer comprising a first rubber material;

a top layer arranged on the base layer and connected to the base layer;

the top layer comprises:

a first side region comprising a second rubber material;

a second side region comprising a third rubber material; and a central region arranged between the first side region and the second side region and comprising a fourth rubber material;

wherein the first rubber material has a higher modulus of elasticity than the fourth rubber material, and wherein the fourth rubber material has a higher modulus of elasticity than the second rubber material and the third rubber material;

the modulus of elasticity of the first rubber material is in the range of from 13 to 16 MPa;

the modulus of elasticity of the second rubber material is in the range of from 7 to 10 MPa;

the modulus of elasticity of the third rubber material is in the range of from 7 to 10 MPa;

the modulus of elasticity of the fourth rubber material is in the range of from 12 to 15 MPa;

the base layer has, on the side facing the top layer, a material projection which extends over the entire length of the tread, wherein a central region is of two-part design and comprises a first central part and a second central part;

the first central part and the second central part are arranged on different sides of the material projection;

the material projection is connected materially at the flanks to the first central part and the second central part; and the thickness of the top layer is not greater than the height of the material projection.

* * * * *